US007350195B2

(12) United States Patent
Herbeck et al.

(10) Patent No.: US 7,350,195 B2
(45) Date of Patent: Mar. 25, 2008

(54) SELECTING A PROGRAM TO IMPROVE A SERVICE CLASS BY REQUESTING THE PROGRAM TO INCREMENTALLY SELF-TUNE

(75) Inventors: David Gerald Herbeck, Rochester, MN (US); David E. Hubka, Rochester, MN (US); Mark Donald Masbruch, Rochester, MN (US); Mark Anthony Perkins, Hopkins, MN (US); Joseph Harold Peterson, Kasson, MN (US); DeVaughn Lawrence Rackham, Rochester, MN (US); Richard Michael Smith, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 10/664,546

(22) Filed: Sep. 19, 2003

(65) Prior Publication Data
US 2005/0066326 A1 Mar. 24, 2005

(51) Int. Cl.
*G06F 9/44* (2006.01)
(52) U.S. Cl. .................................................. 717/127
(58) Field of Classification Search ........ 717/127–133; 718/100
See application file for complete search history.

(56) References Cited

U.S. PATENT DOCUMENTS

| 5,537,542 | A | * | 7/1996 | Eilert et al. | 709/201 |
| 5,675,739 | A | * | 10/1997 | Eilert et al. | 709/226 |
| 6,081,826 | A | * | 6/2000 | Masuoka et al. | 718/100 |
| 6,393,455 | B1 | * | 5/2002 | Eilert et al. | 718/105 |

* cited by examiner

Primary Examiner—Meng-Al T. An
Assistant Examiner—Loren Chauhan
(74) Attorney, Agent, or Firm—Owen J. Gamon

(57) ABSTRACT

A method, apparatus, system, and signal-bearing medium that in an embodiment request a program or programs to tune themselves to run faster or slower if a service class is not meeting its performance goal. In an embodiment, the program is repeatedly requested to incrementally tune itself until the performance goal is met or until no further improvement occurs. In various embodiments, the programs to be requested to tune themselves are selected based on whether the programs are bottlenecks for the service class, whether the programs do the majority of work for the service class, whether the programs easily meet their own performance goals, or whether the programs are low priority. In this way, the programs may be performance tuned in a way that is more effective and less intrusive than by adjusting global, system-level resource allocations.

20 Claims, 7 Drawing Sheets

SELECTING A PROGRAM TO IMPROVE A SERVICE CLASS BY REQUESTING THE PROGRAM TO INCREMENTALLY SELF-TUNE

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention generally relates to computers and more specifically relates to tuning performance at a program-level in a computer.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. Although advances in semiconductor processing and computer architecture have pushed the performance of the computer hardware higher, more sophisticated and complex computer programs also continue to evolve, which can rapidly consume the increased hardware capabilities. Thus, the performance and response time of computer systems continues to be a problem.

These performance problems can be especially acute when a computer system has multiple computer programs executing concurrently and competing for the same limited global physical resources, which must be shared among the computer programs. Examples of such global resources are the processor or processors and memory of the computer system.

In attempt to address these performance problems, some computer systems assign the work of computer programs to service classes and give the service classes priorities and performance goals. The computer systems then monitor the performance of the work and adjust the allocation of global computer resources among the service classes based on the priorities and whether the work is meeting the goals. For example, if work in a high-priority service class is not meeting its goal, the computer systems may give work in that high-priority service class more access to the processor and more memory, perhaps at the expense of work in a lower-priority service class.

Switching processors and memory between service classes can result in several problems. First, switching processors and memory are global, system-level adjustments that can drastically impact the performance of all computer programs on a system-wide basis. Second, it is difficult to predict how such gross adjustments will impact performance, and there may be errors and unintended side effects. Third, some programs attempt to manage their own resources and tune themselves, but they are unaware of how other programs are performing, so their local self-tuning efforts can conflict with the system-wide performance tuning efforts. Finally, a temporary spike in the workload of a program may cause it to tune itself to use more resources, but it may not release those resources when the spike subsides because the program is unaware of how its use of the resources impacts other programs. For example, a database application may increase its pool of database connections in response to a temporary spike in database transactions, but it might then keep those database connections indefinitely.

Without a better way to tune the performance of programs and service classes, the performance of computer systems will continue to suffer.

SUMMARY

A method, apparatus, system, and signal-bearing medium are provided that in an embodiment request a program or programs to tune themselves to run faster or slower if a service class is not meeting its performance goal. In an embodiment, the program is repeatedly requested to incrementally tune itself until the performance goal is met or until no further improvement occurs. In various embodiments, the programs to be requested to tune themselves are selected based on whether the programs are bottlenecks for the service class, whether the programs do the majority of work for the service class, whether the programs easily meet their own performance goals, or whether the programs are low priority. In this way, the programs may be performance tuned in a way that is more effective and less intrusive than by adjusting global, system-level resource allocations.

DETAILED DESCRIPTION

Various embodiments of the invention provide a workload manager that monitors the performance of service classes, into which transactions associated with self-tuning programs are allocated. If a service class is not meeting its performance goal, the workload manager selects a self-tuning program and requests that program to tune itself to run faster if that program is a bottleneck or is initiating the majority of the work for the service class. Alternatively, the workload manager may also request the self-tuning program to run slower if the self-tuning program is low priority or is easily meeting its individual performance goal. The self-tuning program can accomplish this self-tuning by modifying its use and allocation of associated resources. After the workload manager has made the request, the workload manager determines the effect of the request and may repeatedly request the self-tuning program to tune itself until the performance goal is met or until progress is not being made toward the performance goal. The workload manager may notify the self-tuning program of the availability of resources, e.g., the availability of global resources such as processor(s) and memory, which allows the self-tuning program to perform the tuning request while alleviating resource contention between competing self-tuning programs.

Figure 1:
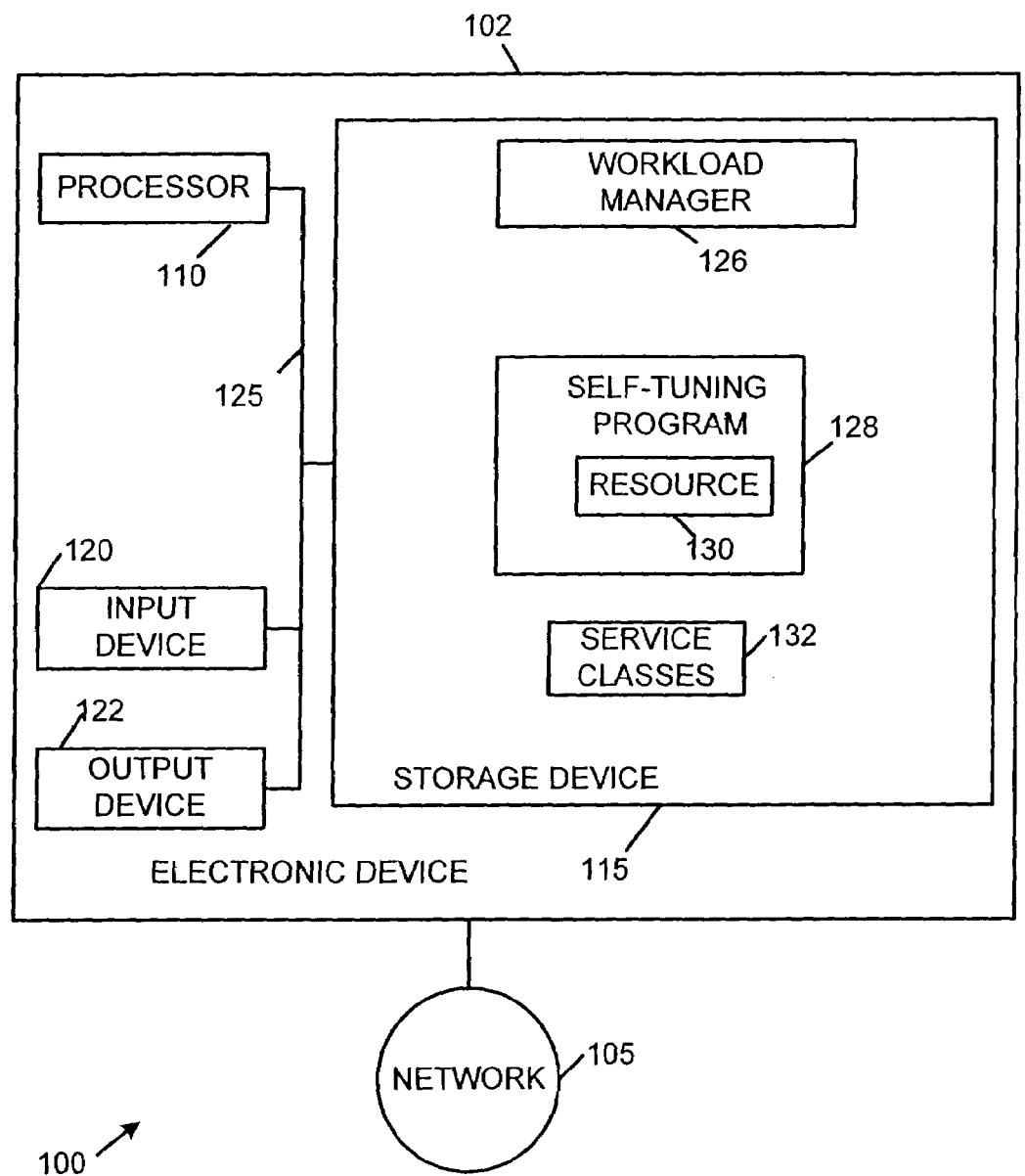
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment, the network 105 is not present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, other embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, hard disk media, floppy disk media, tape media, CD (compact disk) media, DVD (digital video disk) media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, the storage device 115 may be external to the electronic device 102 and/or may be distributed across other electronic devices, such as devices connected to the network 105.

The storage device 115 includes a workload manager 126, a self-tuning program 128, and service classes 132. The workload manager 126 monitors the performance of work in the service classes 132 and requests the self-tuning programs to tune themselves, so that the service classes 132 can meet their performance goals. In an embodiment, the workload manager 126 includes instructions capable of executing on the processor 110 or statements capable of being interpreted by instructions executing on the processor 110 to carry out the functions as further described below with reference to FIGS. 4-6. In another embodiment, the workload manager 126 may be implemented either partially or completely in hardware via logic gates and/or other appropriate hardware techniques in lieu of or in addition to a processor-based system.

The self-tuning program 128 may be any software or computer program capable of tuning itself to increase and/or decrease its performance. In an embodiment, the self-tuning program tunes a resource 130 associated with the self-tuning program 128 to affect the performance of the self-tuning program 128. Although only one self-tuning program 128 is illustrated, in other embodiments any number of self-tuning programs may be present. In an embodiment, the self-tuning program 128 is an application provided by a user or a vendor. In another embodiment, the self-tuning program 128 is part of the operating system of the electronic device 102. In another embodiment, the self-tuning program 128 may have any appropriate origin. In an embodiment, the self-tuning program 128 includes instructions capable of executing on the processor 110 or statements capable of being interpreted by instructions executing on the processor 110 to carry out the functions as further described below with reference to FIGS. 3 and 7. In another embodiment, the self-tuning program 128 may be implemented either partially or completely in hardware via logic gates and/or other appropriate hardware techniques.

In various embodiments the resource 130 may be a thread-pool size, a number of database connections, a number of network connections, network parameters, an internal buffer or cache size, or any combination thereof, but in other embodiments any appropriate resource capable of being tuned or adjusted to affect the performance of the self-tuning program 128 may be used. Although only one resource 130 is illustrated, in other embodiments any number of resources may be present. Although the resource 130 is illustrated as being included within the self-tuning program 128, in other embodiments the resource 130 may be external to the self-tuning program 128. For example, the resource 130 may be a global resource, such as a processor, memory, or any other resource that may be allocated among different programs.

Although the workload manager 126 and the self-tuning program 128 are both illustrated as being contained within the storage device 115 in the electronic device 102, in other embodiments they may be on different storage devices and/or on different electronic devices and may be accessed remotely, e.g., via the network 105. For example, in an embodiment the workload manager 126 is on one electronic device and multiple self-tuning programs 128 are distributed across other electronic devices connected via the network 105. In this way, in an embodiment the workload manager 126 may performance tune a distributed system.

The service classes 132 categorize transactions issued by or associated with the self-tuning program 128 into classes. The transactions may be units of work whose performance is capable of being measured. In various embodiments, the transactions may be database operations (e.g. a database read or update), network requests, or any other appropriate unit of work. The service classes 132 may have associated priorities and/or performance goals. The priority and performance goals may be aggregate for the entire class or individual for transactions within the class. The priority of a service class 132 is with respect to the priority of other service classes and in various embodiments may reflect the order in which the transactions within the service class are performed or the relative amount or timing of resources allocated to the transactions in the service class 132. The service classes 132 may have any number of priorities, which may be expressed as a range of numbers, as low-medium-high, or via any other appropriate technique.

In various embodiments the performance goal may be expressed in terms of a desired response time for a transaction or a group of transactions, a desired rate of speed, or any other appropriate expression of the performance goal. The relationship of the self-tuning programs 128, the transactions, and the service classes 132 is further described below with reference to FIG. 2.

In an embodiment, the workload manager 126 or other program categorizes transactions from the self-tuning program 128 into the service classes 132. In another embodiment, the self-tuning program 128 categorizes its transactions into the service classes 132. In another embodiment, a user, system administrator, or other human determines how transactions are assigned to the service classes 132.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number (including zero) and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number (including zero) of output devices of different types or of the same type may be present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, client computers, server computers, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
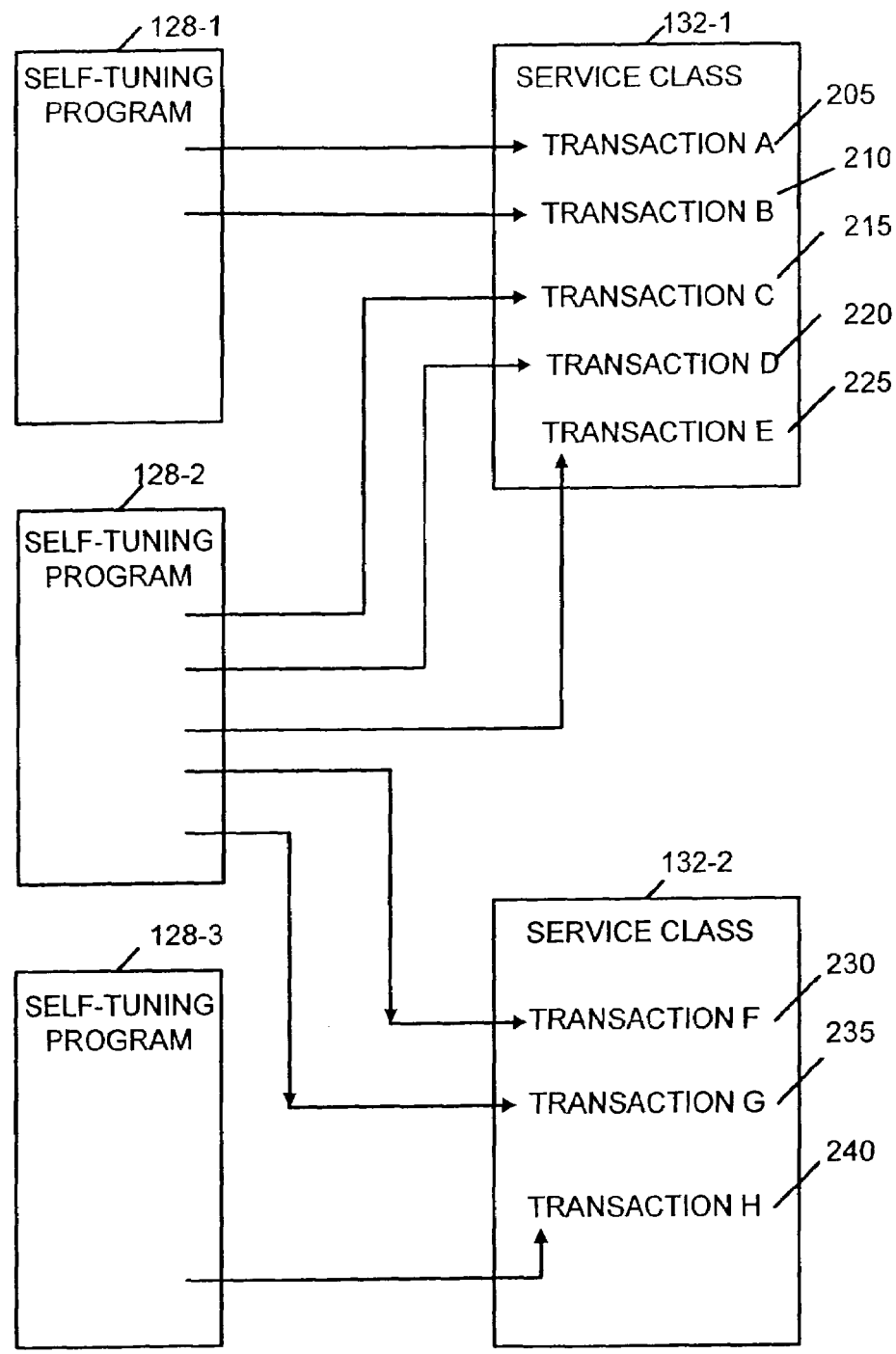
FIG. 2 depicts a block diagram of example service classes and transactions originating from self-tuning programs, according to an embodiment of the invention.

FIG. 2 depicts a block diagram of example service classes and transactions originating from self-tuning programs. Illustrated are self-tuning programs 128-1, 128-2, and 128-3, each of which are examples of the self-tuning program 128 (FIG. 1). The self-tuning programs 128-1, 128-2, and 128-3 initiate, perform, or are otherwise associated with transactions, which are categorized into service classes, such as the example service classes 132-1 and 132-2. The service classes 131-1 and 131-2 are examples of the service classes 132 (FIG. 1). In the example shown, the self-tuning program 128-1 is associated with the transactions 205 and 210 in the service class 132-1; the self-tuning program 128-2 is associated with the transactions 215, 220, and 225 in the service class 132-1 and the transactions 230 and 235 in the service class 132-2; and the self-tuning program 128-3 is associated with the transaction 240 in the service class 132-2. In an embodiment the transactions execute as part of their respective self-tuning programs, but in other embodiments, the self-tuning programs may request the transactions from another process or processes, which may execute on the same or on different electronic devices.

Although FIG. 2 illustrates three self-tuning programs 128-1, 128-2, and 128-3 and two service classes 132-1 and 132-2, in other embodiments any number of self-tuning programs and service classes may be present. Further, a self-tuning program 128 may have any number of associated transactions, and the transactions may be categorized across any number and combination of the service classes 132.

Figure 3:
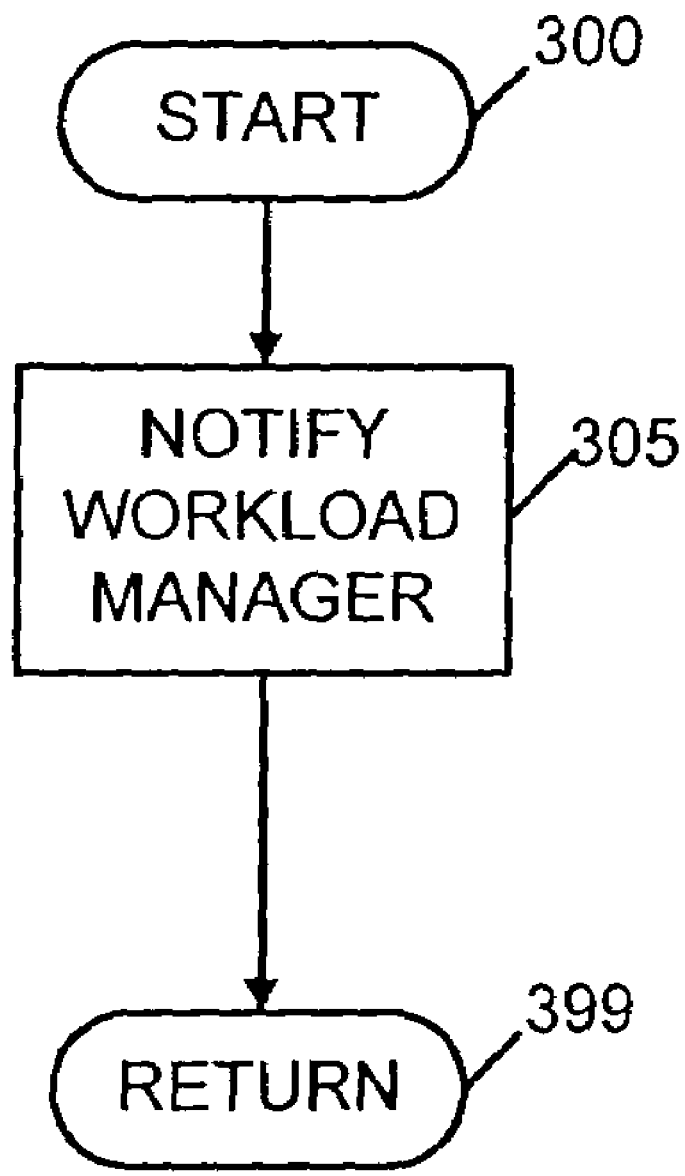
FIG. 3 depicts a flowchart of example processing for an self-tuning program, according to an embodiment of the invention.

FIG. 3 depicts a flowchart of example notification processing for the self-tuning program 128, according to an embodiment of the invention. Control begins at block 300. Control then continues to block 305 where the self-tuning program 128 notifies the workload manager 126 of its desire to receive tuning requests, such as the tuning requests as further described below with reference to FIG. 7. Control then continues to block 399 where the function returns. Of course, the self-tuning program 128 may include other logic not necessary for an understanding of the invention.

In an embodiment, the self-tuning program 128 notifies the workload manager 126 via an extension to the Application Response Measurement (ARM) Application Programming Interface (API). The ARM API is a standard promulgated by the ARM Working Group for monitoring application performance and measuring IT (Information Technology) service levels. The following is example pseudo code for the portion of the self-tuning program 128 that notifies the workload manager 126 of a desire to receive tuning requests:

```
tuneApplicationStart(<unique application ID String>, . . . )
    arm_init(<unique application ID String>, . . . )
        arm_getid( . . . )
        arm_start( . . . )
        arm_stop( . . . )
    arm_end(<unique application ID string>, . . . )
tuneApplicationEnd(unique application ID String>, . . . )
```

"TuneApplicationStart" allows the self-tuning program 128 to notify the workload manager 126 that the self-tuning program 128 is capable of tuning itself and supports the throttle-up, throttle-down, and reset requests, as further described below with reference to FIG. 7.

"Arm_init" defines the application name and (optionally) a user ID. In an embodiment, the self-tuning program 128 acts as the "application," which is the terminology used in ARM. Arm_init is typically executed once while the application initializes. The main reason for defining an application is to help organize the information and to minimize the problem of having duplicate transaction names defined in different applications. The return code from arm_init is a unique identifier generated by the agent; it is passed as a parameter on arm_getid and arm_end calls. In an embodiment, the workload manager 126 acts as the "agent," which is the terminology used in ARM.

"Arm_getid" defines the transaction name and (optionally) details about each transaction. Arm_getid is called once for each transaction name and is typically executed while an application is initializing. There can be any number of transaction names defined for each application. A transaction name is unique within an application. The combination of application name and transaction name uniquely identify a transaction class. The identifier returned on the arm_init call is passed as a parameter on arm_getid so the transaction name will be associated with the correct application. The return code from arm_getid is a unique identifier generated by the agent. It is passed as a parameter on arm_start calls. This identifier is unique for all transaction classes within a system.

"Arm_start" indicates that an instance of a transaction has begun execution. Contrast this with arm_getid, which defines the name of the transaction class during initialization, but does not actually indicate that a transaction is executing. The identifier returned on the arm_getid call is passed as a parameter on arm_start so the agent knows which type of transaction is starting. There can be any number of instances of the same transaction class executing simultaneously on the same system. To identify each one, the return code from arm_start is a unique handle generated by the agent. This handle is unique within a system across all instances of all transactions of all applications. The transaction instance is the fundamental entity that the ARM API measures.

"Arm_stop" indicates that an instance of a transaction has completed. The handle returned on the arm_start call is passed as a parameter to indicate which instance of a transaction is ending. "Arm_stop" may be issued from a different thread or process from which the arm_start was issued. The transaction status is also passed.

"Arm_end" indicates that the application will not be making any more calls to the ARM API. It is typically used when an application is shutting down. Any information about transactions that are in-process (an arm_start has been issued but not yet a corresponding arm_stop) is discarded.

"TuneApplicationEnd" allows the self-tuning program 128 to notify the workload manager 126 that the self-tuning program 128 will no longer support the throttle-up, throttle-down, and reset requests.

In another embodiment of the invention, the ARM API is extended so that the arm_init( ) and arm_end( ) calls have an additional parameter indicating that the self-tuning program 128 wishes to implement tuning requests, such as in the following example pseudocode:

```
arm_init(<unique application ID String>, tuneapplication . . . )
    arm_getid( . . . )
    arm_start( . . . )
    arm_stop( . . . )
arm_end(<unique application ID string>, endtuneapplication . . . )
```

Although various extensions to the ARM API are illustrated above, in other embodiments, the self-tuning program 128 may use other standards, protocols, parameters, message passing, interrupts, or any other suitable technique for communication between the self-tuning program 128 and the workload manager 126.

Figure 4:
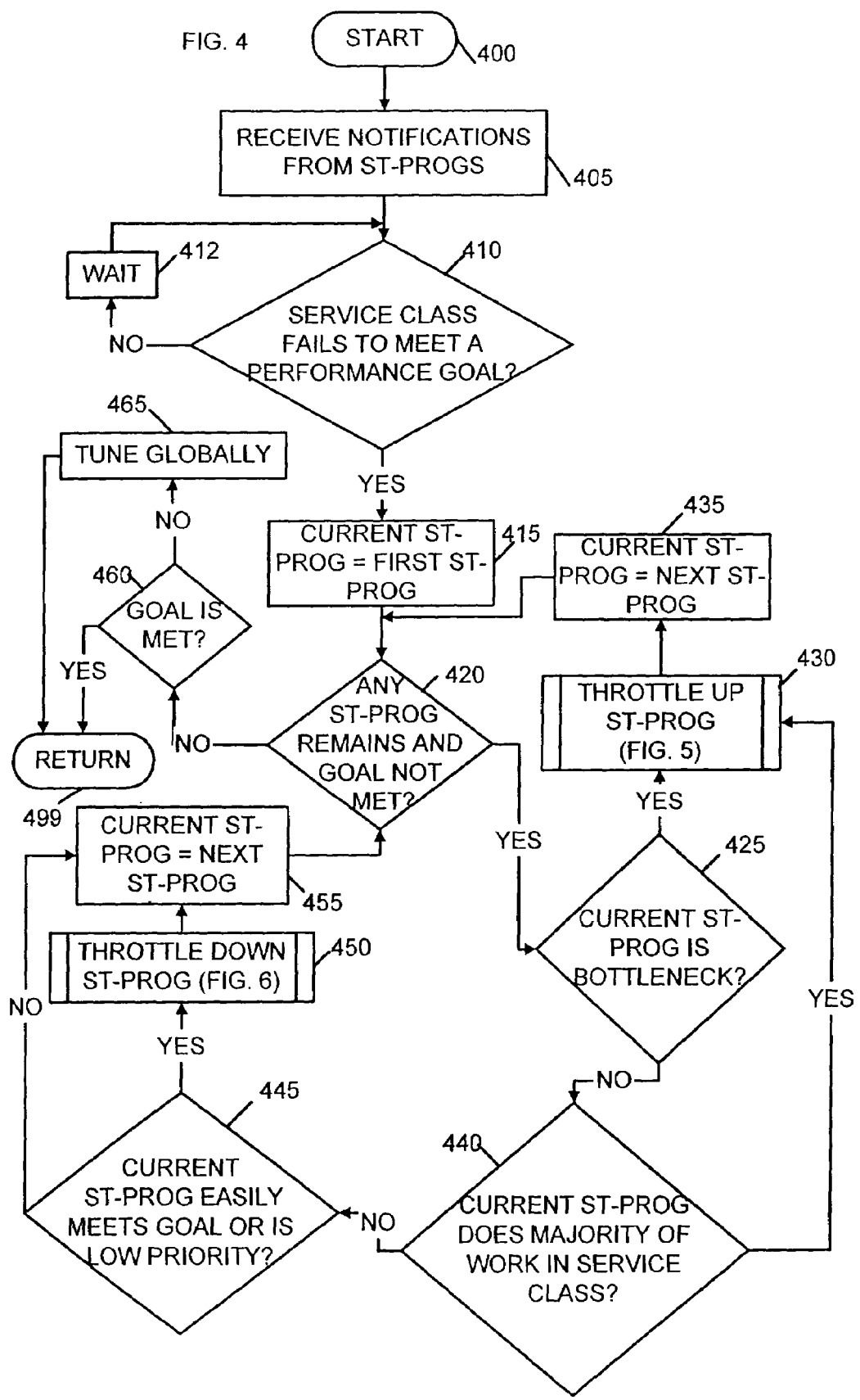
FIG. 4 depicts a flowchart of example processing for a workload manager, according to an embodiment of the invention.

FIG. 4 depicts a flowchart of example processing for the workload manager 126, according to an embodiment of the invention. Control begins at block 400. Control then continues to block 405 where the workload manager 126 receives a notification or notifications (previously initiated at block 305 of FIG. 3, as previously described above) from the self-tuning program or self-tuning programs 128 of their desire to receive tuning requests. Although FIG. 4 illustrates the workload manager 126 receiving a notification only once, in other embodiments the workload manager 126 may receive multiple notifications and may receive the notifications at any time.

Control then continues to block 410 where the workload manager 126 determines whether any of the service classes 132 are not meeting their performance goals. If the determination at block 410 is false, then all of the service classes 132 are meeting their performance goals, so control continues to block 412 where the workload manager 126 waits for a period of time before returning to block 410, as previously described above. Thus, in an embodiment the workload manager 126 periodically performs the check at block 410.

If the determination at block 410 is true, then at least one of the service classes 132 has failed to meet its performance goal, so control continues from block 410 to block 415 where the workload manager 126 sets a current self-tuning program to be a first self-tuning program to be processed. In an embodiment, the self-tuning programs 128 have associated priorities, and the workload manager 126 processes them in priority order, so the first self-tuning program at block 415 is the highest priority program. In another embodiment, the workload manager 126 processes the self-tuning programs 128 in any appropriate order. In an embodiment, the workload manager 126 processes all self-tuning programs having transactions associated with the service class that is not meeting its performance goal (previously determined at block 410). In another embodiment, the workload manager 126 processes all self-tuning programs from which notifications were received at block 405, regardless of with which service class the self-tuning programs are associated based on their transactions.

Control then continues to block 420 where the workload manager 126 determines whether any self-tuning program remains to be processed and the service class performance goal has not yet been met. If the determination at block 420 is true, then control continues to block 425 where the workload manager 126 determines whether the current self-tuning program is a bottleneck for the service class that is not meeting its performance goal.

In an embodiment, the workload manager 126 makes the determination at block 425 by checking whether the response time for the transactions in the service class that are associated with the current self-tuning program divided by the response time for all transactions in the service class is greater than a threshold value. In another embodiment, the workload manager 126 makes the determination at block 425 by checking whether the response time for the transactions in the service class that are associated with the current self-tuning program is greater than a threshold value. In another embodiment at block 425, the workload manager 126 may use any appropriate check or calculation to determine whether the current self-tuning program is a bottleneck for the service class that is not meeting its performance goal.

If the determination at block 425 is true, then the current self-tuning program is a bottleneck for the service class that is not meeting its performance goal, so control continues to block 430 where the workload manager 126 throttles up the current self-tuning program as further described below with reference to FIG. 5. Control then continues to block 435 where the workload manager 126 sets the current self-tuning program to the next self-tuning program to be processed. Control then returns to block 420, as previously described above.

If the determination at block 425 is false, then the current self-tuning program is not a bottleneck for the service class that failed to meet its performance goal, so control continues to block 440 where the workload manager 126 determines whether the current self-tuning program is associated with the majority of work in the service class that failed to meet its performance goal.

In an embodiment, the workload manager 126 makes the determination at block 440 by checking whether the current self-tuning program currently is associated with the majority of transactions in the service class. In another embodiment, the workload manager 126 makes the determination at block 440 by checking whether the current self-tuning program has initiated the majority of transactions associated with the service class within a time period. In another embodiment, the workload manager 126 makes the determination at block 440 by checking whether the current self-tuning program has initiated transactions within a time period whose aggregate response time is greater than half of the response time for all transactions in the service class during that time period. In another embodiment, the workload manager 126 may use any appropriate technique for making the determination of block 440. In another embodiment, the check at block 440 is optional or not used.

If the determination at block 440 is true, then the current self-tuning program is associated with the majority of work in the service class that failed to meet its performance goal, so control continues to block 430 where the current self-tuning program is throttled up, as previously described above.

If the determination at block 440 is false, then the current self-tuning program is not associated with the majority of work in the service class that failed to meet its performance goal, so control continues to block 445 where the workload manager 126 determines whether the current self-tuning program easily meets its performance goal or the current self-tuning program has a low priority.

In an embodiment, the workload manager 126 determines whether the current self-tuning program has a low priority by comparing the priority of the self-tuning program to a threshold. In another embodiment, the workload manager 126 determines whether the current self-tuning program has a low priority by comparing the priority of the self-tuning program to the average of priorities of other programs associated with the service class. In an embodiment, the workload manager 126 determines the priority of the self-tuning program by inspecting the priority of the transactions associated with the self-tuning program. In another embodiment, the workload manager 126 may use any appropriate technique for determining whether the current self-tuning program has a low priority.

In an embodiment, workload manager 126 determines whether the current self-tuning program easily meets its goal at block 445 by checking whether the response time of transactions in the service class that were initiated by the current self-tuning program is less than a threshold percentage of the goal for the current self-tuning program. In another embodiment, the workload manager 126 determines whether the current self-tuning program easily meets its goal at block 445 by checking whether the response time of all transactions initiated by the current self-tuning program is less than a threshold percentage of the goal for the current self-tuning program, regardless of with which service class the transactions are associated. In another embodiment, the workload manager 126 may use any appropriate technique for determining whether the current self-tuning program easily meets its goal.

If the determination at block 445 is true, then control continues to block 450 where the workload manager 126 throttles down the current self-tuning program as further described below with reference to FIG. 6. Control then continues to block 455 where the workload manager 126 sets the current self-tuning program to be the next self-tuning program to be processed. Control then returns to block 420, as previously described above.

If the determination at block 445 is false, then control continues to block 455, as previously described above.

If the determination at block 420 is false, then either no self-tuning program remains to be processed or the performance goal for the service class has now been met, so control continues to block 460 where the workload manager 126 determines whether the performance goal for the service class is now met. If the determination at block 460 is true, then the service goal is met, so control continues to block 499 where the function returns. If the determination at block 460 is false, then the service goal is not met, so control continues to block 465 where the workload manager 126 optionally tunes the electronic device 102 globally using resources of the electronic device that may be common to some or all of the self-tuning programs 128. In various embodiments, the global resource may be the allocation of processor time or memory among the self-tuning programs 128, but in other embodiments any appropriate global resource may be tuned.

Although FIG. 4 illustrates the workload manager 126 tuning the electronic device 102 globally only at block 465, in other embodiments, the workload manager 126 may perform global tuning at any time, in lieu of or in addition to the program-level tuning described in FIG. 4. For example, in some embodiments, the workload manager 126 performs global tuning first and then requests the self-tuning programs 128 to tune themselves. This approach may work well in the following example. In a partitioned system, programs A & B are running in partition 1, and programs C & D are running in partition 2. If partition 1 is busy and partition 2 is idle, the workload manager 126 globally shifts resources from partition 2 to partition 1 prior to requesting programs A, B, C, and D to tune themselves.

In another example of global tuning, the workload manager 126 predicts whether the performance goal of a service class will be met in the future and globally shifts resources among the service classes to anticipate workload changes. For example, if partitions 1 and 2 are associated with different time zones and their transaction volumes fluctuate throughout the day, being greater during waking hours and less at night, the workload manager 126 predicts the resource needs of the partitions based on the known fluctuations in transactions and the time zone difference and globally tunes resources between the partitions prior to requesting the programs A, B, C, and D to tune themselves.

Figure 5:
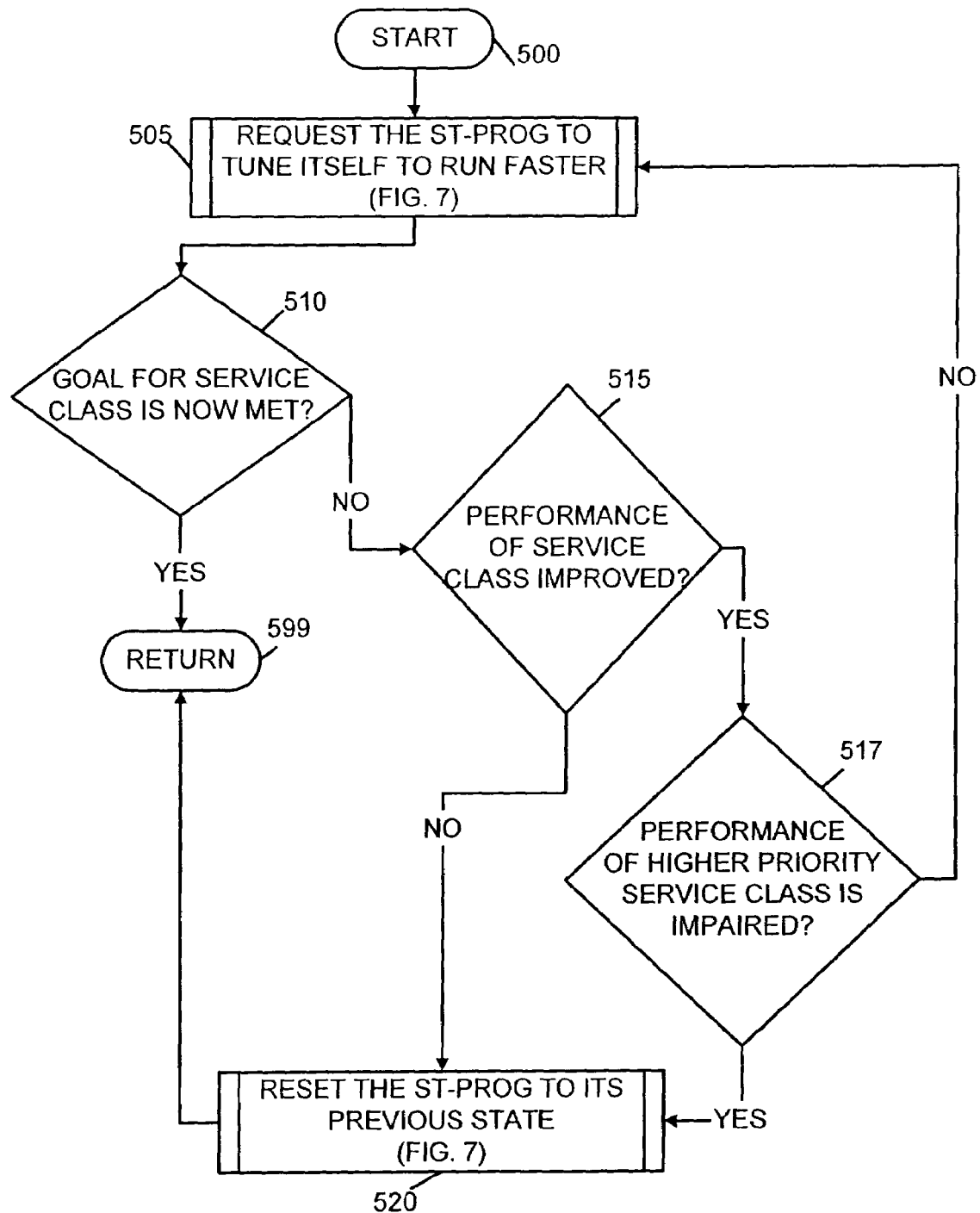
FIG. 5 depicts a flowchart of example processing in the workload manager for a throttle-up function, according to an embodiment of the invention.

FIG. 5 depicts a flowchart of example processing for a throttle-up function in the workload manager 126, according to an embodiment of the invention. Control begins at block 500. Control then continues to block 505 where the workload manager 126 requests the current self-tuning program to run faster by tuning its program-specific resources as further described below with reference to FIG. 7. In various embodiments, the workload manager 126 may notify the self-tuning program 128 of the availability of global resources, so that the self-tuning program 128 may accomplish the request without undue resource contention between competing self-tuning programs. Control then continues to block 510 where the workload manager 126 determines whether the performance goal for the service class is now met. If the determination at block 510 is true, then control continues to block 599 where the function returns since no more tuning is needed to meet the performance goal for the service class.

If the determination at block 510 is false, then the performance goal for the service class is still not met, so control continues to block 515 where the workload manager 126 determines whether the performance of the service class has improved since the current self-tuning program was requested to tune itself at block 505. If the determination at block 515 is true, then performance has improved, so control continues to block 517 where the workload manager 126 determines whether the performance of any service class that has a higher priority than the current service class was impaired since the request at block 505. If the determination at bock 517 is true, then performance of the current service class was improved (via the request at block 505) at the expense of a service class with a higher priority than the current service class, so control continues to block 520 where the workload manager 126 requests the self-tuning program to reset itself to its previous state prior to the most-recent request at block 505, as further described below with reference to FIG. 7.

If the determination at block 517 is false, then the performance of the current service class was improved, but not at the expense of a higher priority service class, so control returns to block 505 where the workload manager 126 once again requests the current self-tuning program to tune itself, as previously described above.

Although the determination at block 517 is illustrated as being performed if the performance of the service class has improved, but the goal is not met, in another embodiment if the goal for the service class is met at the expense of a higher priority service class, the self-tuning program is also reset to its previous state.

If the determination at block 515 is false, then the tuning previously requested at block 505 either made no difference to the performance of the service class, or the tuning actually made the performance worse, so control continues to block 520 where the workload manager 126 requests the self-tuning program to reset itself to its previous state prior to the most recent request at block 505, as further described below with reference to FIG. 7. Control then continues to block 599 where the function returns.

Figure 6:
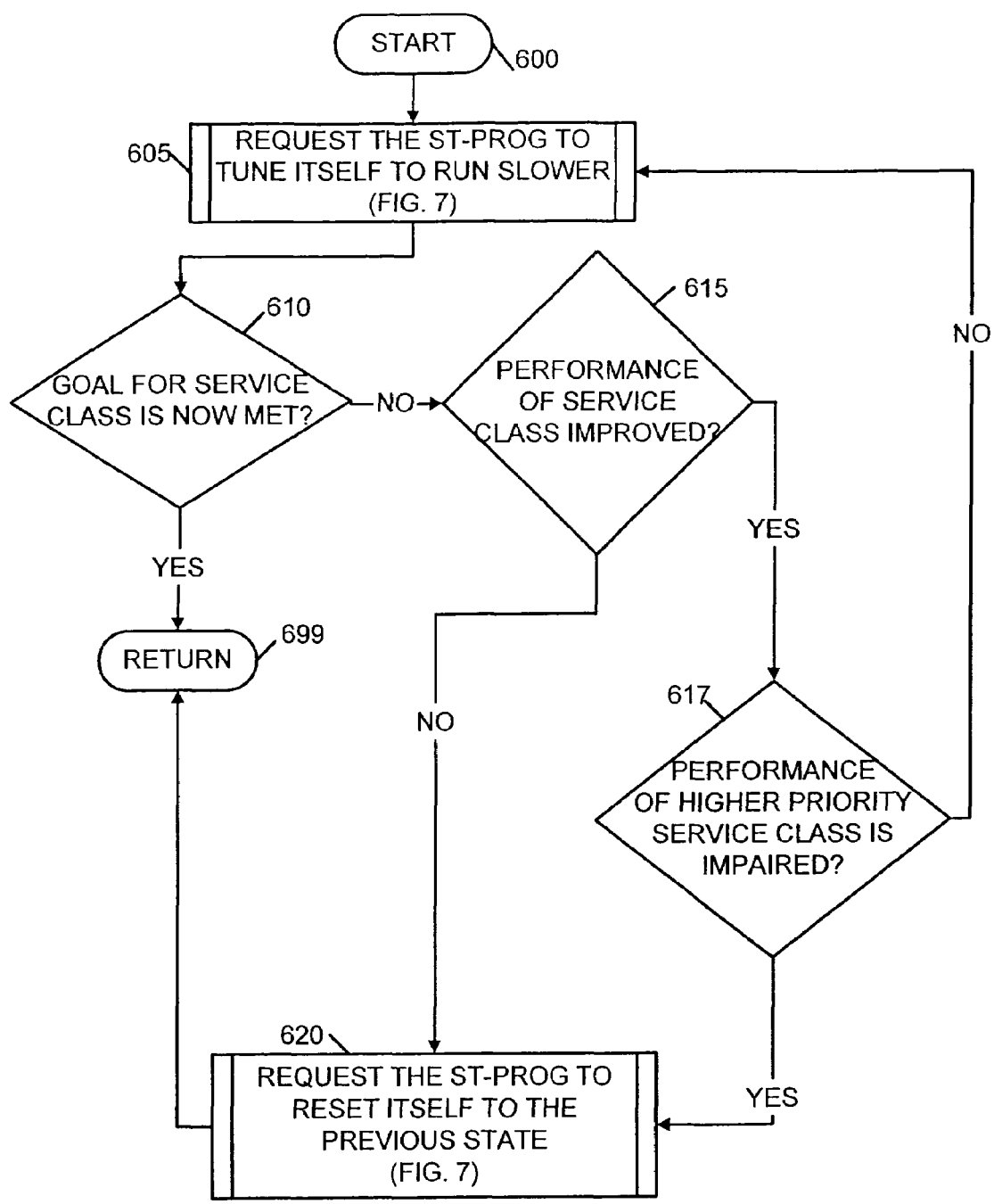
FIG. 6 depicts a flowchart of example processing in the workload manager for a throttle-down function, according to an embodiment of the invention.

FIG. 6 depicts a flowchart of example processing for a throttle-down function in the workload manager 126, according to an embodiment of the invention. Control begins at block 600. Control then continues to block 605 where the workload manager 126 requests the current self-tuning program in the self-tuning programs 128 to run slower by incrementally tuning its program-specific resources, as further described below with reference to FIG. 7. Control then continues to block 610 where the workload manager 126 determines whether the performance goal for the service class is now met. If the determination at block 610 is true, then control continues to block 699 where the function returns since no more tuning is needed to meet the performance goal for the service class.

If the determination at block 610 is false, then control continues to block 615 where the workload manager 126 determines whether the performance of the service class has improved since the current self-tuning program was requested to tune itself to run slower at block 605. If the determination at block 615 is true, then the performance of the service class has improved, so control continues to block 617 where the workload manager 126 determines whether the performance of any service class that has a higher priority than the current service class was impaired since the request at block 605. If the determination at block 617 is true, then performance of the current service class was improved (via the request at block 505) at the expense of a service class with a higher priority than the current service class, so control continues to block 620 where the workload manager 126 requests the self-tuning program to reset itself to its previous state prior to the most-recent request at block 605, as further described below with reference to FIG. 7.

If the determination at block 617 is false, then the performance of the current service class was improved, but not at the expense of a higher priority service class, so control returns to block 605 where the workload manager 126 once again requests the current self-tuning program in the self-tuning programs 128 to incrementally tune itself, as previously described above.

Although the determination at block 617 is illustrated as being performed if the performance of the service class has improved, but the goal is not met, in another embodiment if the goal for the service class is met at the expense of a higher priority service class, the self-tuning program is also reset to its previous state.

If the determination at block 615 is false, then the tuning previously requested at block 605 either made no difference to the performance of the service class, or the tuning actually made the performance worse, so control continues to block 620 where the workload manager 126 requests the current self-tuning program in the self-tuning programs 128 to reset itself to its previous state prior to the most recent tuning request at block 605, as further described below with reference to FIG. 7. Control then continues to block 699 where the function returns.

Figure 7:
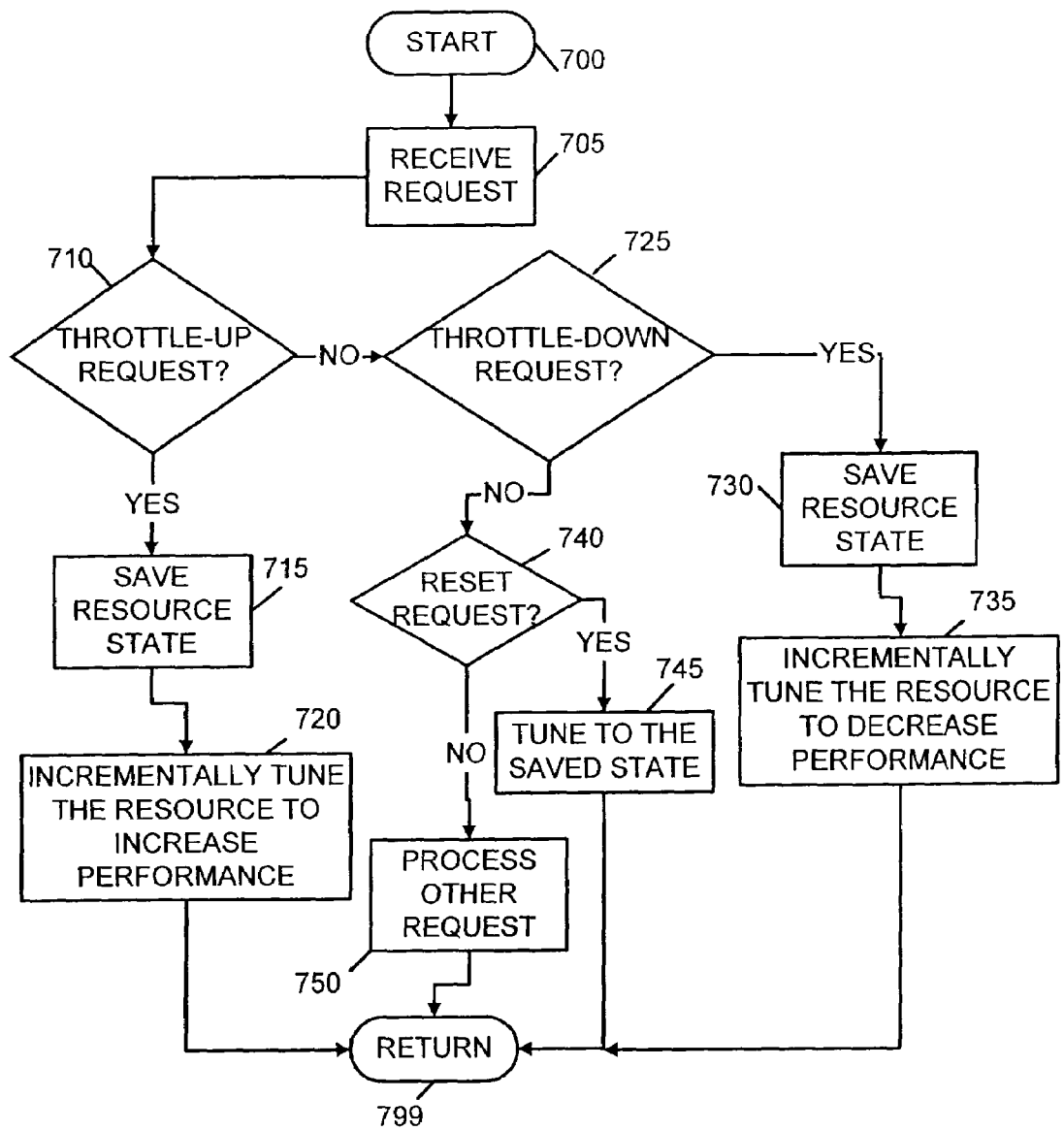
FIG. 7 depicts a flowchart of example processing in a self-tuning program for a throttle-up function, a throttle-down function, and a reset function, according to an embodiment of the invention.

FIG. 7 depicts a flowchart of example processing in the self-tuning program 128 for performing a throttle-up function, a throttle-down function and a reset function, according to an embodiment of the invention.

Control begins at block 700. Control then continues to block 705 where the self-tuning program 128 receives a request from the workload manager 126. Control then continues to block 710 where the self-tuning program 128 determines whether the request previously received at block 705 is a throttle-up request.

If the determination at block 710 is true, then the request is a throttle-up request, so control continues to block 715 where the self-tuning program 128 saves the state of the resource 130. Control then continues to block 720 where the self-tuning program 128 incrementally tunes the resource 130 to increase the performance of the self-tuning program 128. Control then continues to block 799 where the function returns.

If the determination at block 710 is false, then the request is not a throttle-up request, so control continues to block 725 where the self-tuning program 128 determines whether the request previously received at block 705 is a throttle-down request. If the determination at block 725 is true, then the request is a throttle-down request, so control continues to block 730 where the self-tuning program 128 saves the state of the resource 130. Control then continues to block 735 where the self-tuning program 128 incrementally tunes the resource 130 to decrease the performance of the self-tuning program 128. Control then continues to block 799 where the function returns.

If the determination at block 725 is false, then the request is not a throttle-down request, so control continues to block 740 where the self-tuning program 128 determines whether the request is a reset request. If the determination at block 740 is true, then the request is a reset request, so control continues to block 745 where the self-tuning program 128 tunes the resource 130 to the saved resource state. Control then continues to block 799 where the function returns.

If the determination at block 740 is false, then control continues to block 750 where the self-tuning program 128 processes any other request that the self-tuning program 128 optionally supports. Control then continues to block 799 where the function returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. An apparatus that has a processor comprising:
   means for selecting a program from among a plurality of programs if a service class fails to meet a performance goal, wherein the means for selecting further comprises means for determining that the program is associated with a majority of work in the service class, wherein the means for determining further comprises determining that the program is associated with transactions within a time period whose aggregate response time is greater than half of a response time for all transactions in the service class during the time period;
   means for requesting the program to incrementally self-tune; and
   means for determining whether the service class meets the performance goal after the means for requesting.

2. The apparatus of claim 1, wherein the means for selecting further comprises:
  means for determining that the program is a bottleneck for the service class.

3. A storage medium encoded with instructions, wherein the instructions when executed processor perform steps that comprise:
  selecting a program from among a plurality of programs if a service class fails to meet a performance goal, wherein the selecting further comprises determining that the program is associated with a majority of work in the service class, wherein the determining further comprises determining that the program is associated with transactions within a time period whose aggregate response time is greater than half of a response time for all transactions in the service class during the time period;
  requesting the program to incrementally self-tune; and
  determining whether the service class meets the performance goal after the requesting.

4. The storage medium of claim 3, wherein the selecting further comprises:
  determining that the program has a priority below a threshold.

5. The storage medium of claim 3, further comprising:
  if the service class does not meet the performance goal after the requesting, determining whether performance of the service class has improved.

6. The storage medium of claim 5, further comprising:
  if the performance of the service class has improved, repeating the requesting so long as the service class does not meet the performance goal and the performance of the service class improves.

7. The storage medium of claim 5, further comprising:
  if the performance of the service class has not improved, requesting the program to reset to a previous tuned state.

8. The storage medium of claim 3, wherein the performance goal is a response time goal for the service class.

9. The storage medium of claim 3, wherein the requesting the program to incrementally self-tune further comprises:
  requesting the program to increase performance if the program is a bottleneck for the service class.

10. The storage medium of claim 3, wherein the requesting the program to incrementally self-tune further comprises:
  requesting the program to decrease performance if the response time of the transactions in the service class that are associated with the program is less than a threshold percentage of a response-time goal for the program.

11. An electronic device comprising:
  a processor; and
  a storage device encoded with instructions, wherein the instructions when executed on the processor comprise:
    receiving a plurality of notifications indicating that a respective plurality of programs support performance tuning,
    determining that a first service class failed to meet a performance goal,
    selecting at least one program from the plurality of programs, wherein the selecting further comprises determining that the at least one program is associated with a majority of work in the first service class, wherein the determining further comprises determining that the at least one program is associated with transactions within a time period whose aggregate response time is greater than half of a response time for all transactions in the first service class during the time period,
    requesting the at least one program to incrementally self-tune, and
    determining whether the requesting caused performance of the first service class to improve.

12. The electronic device of claim 11, wherein the requesting further comprises:
  requesting the at least one program to self-tune a resource associated with the at least one program.

13. The electronic device of claim 11, wherein the instructions further comprise:
  requesting the at least one program to self-tune a resource internal to the program.

14. The electronic device of claim 11, wherein the instructions further comprise:
  if the requesting did not cause the performance of the first service class to improve, selecting a second program from the plurality of programs and requesting the second program to incrementally self-tune.

15. The electronic device of claim 11, wherein the instructions further comprise:
  if the requesting did cause the performance of the first service class to improve, repeating the requesting until the performance goal is met or until the performance of the first service class no longer improves.

16. The electronic device of claim 11, wherein the instructions further comprise:
  if the requesting did not cause performance of the first service class to meet the performance goal, tuning a global resource that is common to all the plurality of programs.

17. The electronic device of claim 11, wherein the instructions further comprise:
  if the requesting did cause the performance of the first service class to improve, determining whether performance of a second service class was impaired subsequent to the requesting, wherein the second service class has a higher priority than the first service class.

18. The electronic device of claim 17, wherein the instructions further comprise:
  if the performance of the second service class was impaired subsequent to the requesting, resetting the program to a previous tuned state.

19. The electronic device of claim 11, wherein the instructions further comprise:
  globally tuning the electronic device prior to the determining.

20. The electronic device of claim 11, wherein the requesting further comprises:
  notifying the at least one program of a global resource available for use by the at least one program.

* * * * *